United States Patent [19]
Takai et al.

[11] Patent Number: 6,077,463
[45] Date of Patent: Jun. 20, 2000

[54] PROCESS FOR PRODUCING GRAPHITE MATERIAL FOR NEGATIVE ELECTRODE USED IN LITHIUM SECONDARY BATTERY

[75] Inventors: Yasuyuki Takai; Tetsuji Takemura; Mikio Watanabe, all of Ibaraki-ken, Japan

[73] Assignee: Petoca, Ltd., Tokyo, Japan

[21] Appl. No.: 09/245,302

[22] Filed: Feb. 5, 1999

[30] Foreign Application Priority Data

Feb. 18, 1998 [JP] Japan .................................. 10-035751

[51] Int. Cl.$^7$ ................................ C01B 31/04; D01F 9/12
[52] U.S. Cl. ........................ 264/29.2; 264/29.7; 264/141; 423/447.6; 423/447.8
[58] Field of Search ................................ 264/29.2, 29.7, 264/141; 423/447.6, 447.8

[56] References Cited

U.S. PATENT DOCUMENTS

| | | | |
|---|---|---|---|
| 4,942,002 | 7/1990 | Feist | 264/29.7 X |
| 5,300,272 | 4/1994 | Simandl et al. | 264/29.7 X |
| 5,951,959 | 9/1999 | Nishimura | 264/29.2 X |

OTHER PUBLICATIONS

Patent Abstracts of Japan, vol. 096, No. 007, Jul. 31, 1996, JP 08 083608, Mar. 26, 1996.

*Primary Examiner*—Leo B. Tentoni
*Attorney, Agent, or Firm*—Oblon, Spivak, McClelland, Maier & Neustadt, P.C.

[57] ABSTRACT

A process for producing graphite materials for a negative electrode used in a lithium secondary battery which process includes the steps of packing carbon materials having an average particle diameter of 5 to 50 $\mu$m in a plurality of boxes, placing the boxes in a graphitization furnace, subjecting the graphite materials to graphitization treatment, and thereafter subjecting the resultant graphite materials to uniformization treatment by mixing and agitation. The above process is capable of decreasing the influence on the qualitative variation of graphite materials ascribed to packing operation into boxes for graphitization, to the position of the materials in a graphitization furnace, and to bubbling phenomenon or the like through graphitization treatment, and is also capable of stabilizing the qualities of the resulting graphite materials and increasing the productivity.

5 Claims, 2 Drawing Sheets

PERSPECTIVE VIEW

ELEVATIONAL VIEW

PLAN VIEW

PROCESS FOR PRODUCING GRAPHITE MATERIAL FOR NEGATIVE ELECTRODE USED IN LITHIUM SECONDARY BATTERY

BACKGROUND OF THE INVENTION

1. Field of the Invention

The present invention relates to a process for producing graphite materials which are well suited to a negative electrode material for use in a lithium secondary battery. More particularly, the present invention pertains to a process for producing graphite materials for a negative electrode used in a lithium secondary battery which process is capable of uniformizing the variation in the physical properties of graphite materials caused in a graphitizing treatment; stabilizing the resultant graphite quality; and also increasing its productivity. The present invention is also concerned with a process for producing graphite materials which enhances the qualitative stability thereof at the time of employing two or more kinds of mixed graphite materials.

2. Description of the Related Arts

In recent years, electronic appliances have achieved rapid technological development searching for miniaturization, lightweight property and high performance. Thereby, portable electronic appliances have remarkably been widespread, which are typified by celler telephone, PHS (Personal Handy-phone System), cam coders and personal computers. Accompanying the development and progress of these new electronic appliances, new secondary batteries have appeared on the market, including a nickel-hydrogen battery and a lithium secondary battery.

In particular, a lithium secondary battery is imparted with various advantages such as high energy density, high electromotive force, a wide range of operating termperatures due to the employment of a nonaqueous electrolyte solution, excellence in long-term preservation, lightweight property, miniaturization, and the like. Accordingly, the aforesaid lithium secondary battery is expected to find practical use of high performance batteries for use in electric automobiles, electricity storage and the like.

The lithium secondary battery has realized improvement in its performance and safety by using, in a negative electrode, a carbon material in place of metallic lithium. In more detail, in the case where a carbon material is used in a negative electrode, lithium ions are incorporated in the carbon structure, whereby lithium dendrite is prevented from forming, and thus the safety of the battery is drastically enhanced. There is proposed the use of pitch-based milled graphite fibers as a negative electrode for a lithium secondary battery, for example, in Japanese Patent Application Laid-open Nos. 325967/1993 (Hei-5), 36802/1994 (Hei-6), and 90725/1995 (Hei-7).

The milled graphite fibers used as a negative electrode for a lithium secondary battery are obtained by, for example, spinning a pitch as a starting material, infusibilizaing the spun fibers, then pulverizing (milling) the resulting carbonized materials, regulating the particle size thereof, and thereafter graphitizing the regulated particles of the carbon materials.

The graphitization treatment is put into practice usually by packing carbon materials which are obtained by carbonization followed by milling, in prescribed graphite-made boxes, placing the boxes in a graphitization furnace, and heating the boxes at a high temperature of 2000° C. or higher.

In order to enhance the graphitization efficiency, though depending upon the size of the graphitization furnace, the graphitization is simultaneously carried out in such a manner that a plurality of boxes each accomodating a carbon material are arranged in a plurality of rows in a plurality of stages.

The temperature in the graphitization furnace, although depending upon the heating system and the extent of thermal insulation, usually becomes higher as the position of the box comes close to the central portion of the furnace. Such difference in temperature tends to make difference in the degree of graphitization after the graphitization treatment depending upon the position of each box arranged in the furnace, that is, the closer the position of the box to the center of the furnace, the higher the degree of graphitization, on the contrary, the closer the position of the box to the wall of the furnace, the lower the degree of graphitization. In addition, there is a problem that the particle size distribution of the graphite is made non-uniform even in the same box because of charging operation or bubbling and the like due to the gases generated through graphitization.

The above-mentioned problems are primary contributors to the fact that the same performance is not necessarily realized in the batteries produced from graphite materials which are simultaneously treated in the same graphitization furnace, but which are located in different boxes or which are located in different places of the same box.

On the other hand, for the purpose of complementing the items to be improved in a single kind of material, researches have been made on the mixed use of various materials.

With regard to the embodiment of the mixing, the scope of the researches covers wide fields including a variety of combinations of the materials to be mixed, even if limited thereto, such as graphite base/graphite base, carbon base/carbon base, graphite base/carbon base, graphite base/carbon base that are incorporated with an electroconductive material and a mixed system of at least three kinds of materials.

In regard to the mixing of graphite base/graphite base, for example, there are disclosed the mixing of spheroidal graphitized carbon particles/graphitized carbon short fiber in Japanese Patent Application Laid-Open No. 111818/1994 (Hei-6); the mixing of graphite materials comprising spheroidal particles (MCMB)/graphite fine particles having a smaller particle diameter than MCMB (natural graphite, artificial graphite or the like) in Japanese Patent Application Laid-Open No. 37618/1995 (Hei-7); the mixing of graphite materials comprising spheroidal particles (MCMB) or the like/fibrous graphite in Japanese Patent Application Laid-Open No. 287952/1996 (Hei-8); the mixing of milled mesophas pitch base carbon fibers/natural or artificial graphite in Japanese Patent Application Laid-Open No. 83608/1996 (Hei-8); and the mixing of graphite material/graphite material different in bulk density from each other in Japanese Patent Application Laid-Open No. 180873/1996 (Hei-8).

SUMMARY OF THE INVENTION

An object of the present invention is to provide a process for producing graphite materials for a negative electrode used in a lithium secondary battery which process is capable of decreasing the influence on the qualitative variation of a graphite material ascribed to packing operation into boxes for graphitization, and to the position thereof in a graphitization furnace and bubbling phenomenon or the like, through the graphitization treatment, and is also capable of stabilizing the resultant graphite quality and increasing its productivity.

Another object of the present invention is to provide a process for producing graphite materials for a negative electrode used in a lithium secondary battery characterized in that the quality of the graphite material is stabilized by reducing the variability in the quality thereof in the case of mixing at least two kinds of materials such as the foregoing graphite materials subjected to graphitization treatment/an other kind of graphite material.

In the light of the above-mentioned subject, intensive extensive research and investigation were made by the present inventors. As a result, it has been found that the qualitative variation of graphite materiasl can be lessened by mixing graphite materials in a prescribed number of graphite-boxes that are each arranged at a prescribed position in a graphitization furnace and further controlling the degree of graphitization; and by mixing at least two kinds of graphite materials with a specific mixer, while specific property is made to be the control index. The present invention has been accomplished by the above-mentioned findings and information.

That is to say, the present invention provides:

(1) a process for producing graphite materials for a negative electrode used in a lithium secondary battery which process comprises the steps of packing a carbon material having an average particle diameter of 5 to 50 μm in a plurality of boxes, placing the boxes in a graphitization furnace, subjecting said materials to graphitization treatment, and thereafter subjecting the resultant graphite materials to uniformization treatment by mixing and agitation.

The present invention is further characterized:

(2) in that the graphite materials in all the boxes that are located in the graphitization furnace are subjected to uniformization treatment by collective mixing agitation or divided mixing agitation wherein said plurality of boxes are divided into prescribed numbers of box groups, and the graphite materials contained in the boxes belonging to each box group are individually mixed and agitated per each box group;

(3) by carrying out the uniformization treatment by the use of a fixed vessel-type mixer equipped with a planetarily motional screw;

(4) in that the carbon materials are milled carbon fibers which are produced by spinning a mesophase pitch as a starting material, infusibilizing the spun fibers, carbonizing the infusibilized fibers to form carbon fibers, milling the carbon fibers thus obtained, and regulating the particle size of the milled carbon fibers; and further (5) by mixing the graphite materials obtained by subjecting the milled carbon fibers as set forth in the preceding item (4) to graphitization treatment with at least one other kind of graphite material, by the use of a fixed vessel-type mixer equipped with a planetarily motional screw.

DESCRIPTION OF THE PREFERRED EMBODIMENTS

Figure 1:
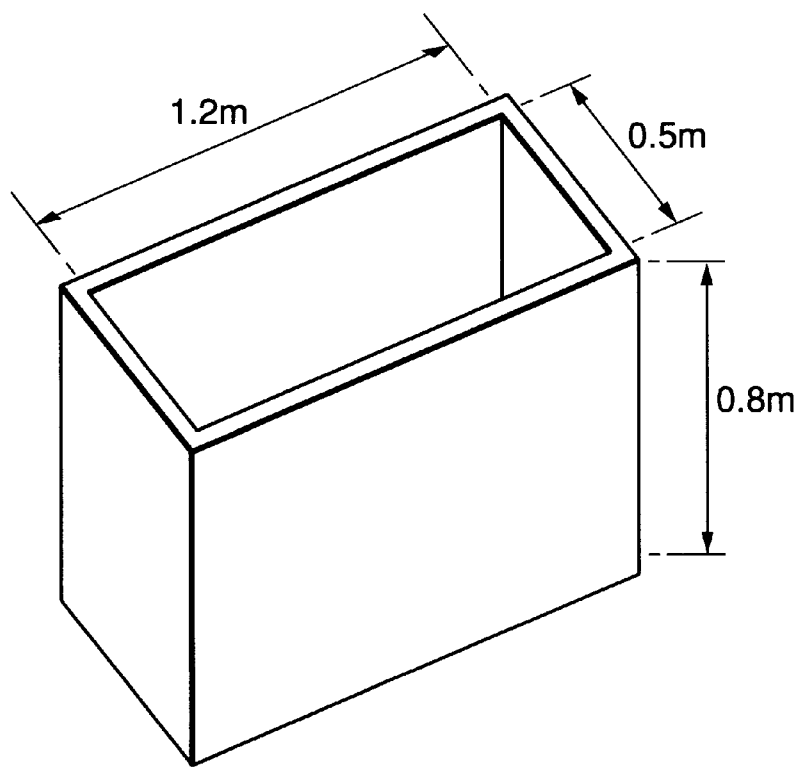
FIG. 1 is schematic views which show one example of the shape of the box to be used in the graphitization treatment according to the present invention, and which include a perspective view, an elevational view and a plan view.
Figure 1:
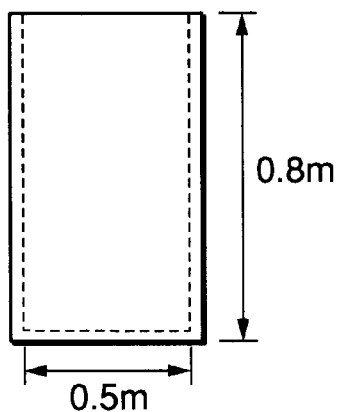
Figure 1:
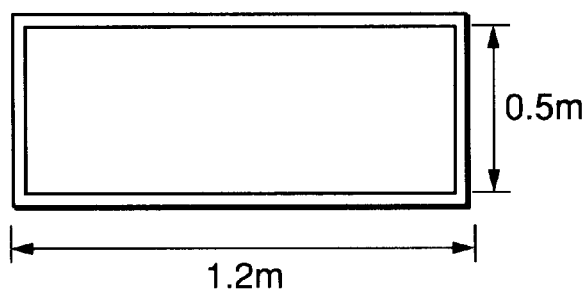

In general, agitation by means of a mixer is popularized as a method for suppressing the qualitative variation of powders and granules. However, in the case of producing graphite materials for a negative electrode used in a lithium secondary battery, it is insufficient to merely mix the graphite materials in each of the boxes.

A variety of investigations were made by the present inventors on the types of mixers, operational conditions and control targets in order to achieve the objects of the present invention. As a result, it has been found that there are obtainable graphite materials which are qualitatively stabilized and economically advantageous without causing variability in the performance of a battery by a method in which a specific mixer is selected, a degree of graphitization is selected as a control target, and the materials in a plurality of boxes are mixed taking into consideration the arrangement thereof in a graphitization furnace so as to suppress the variation coefficient of the degree of graphitization within a definite range. It has further been found that the above-mentioned method is useful for mixing at least two kinds of graphite materials as well. The aforestated findings led to the completion of the present invention.

In what follows, the present invention will be described in more detail.

I. Uniformization After Graphitization Treatment

Carbon Material

The carbon material to be graphitized is not specifically limited provided that it has a prescribed particle size. From the aspect of performance as a negative electrode for a battery, however, there is preferably used mesophase pitch base carbon fiber which has been milled after carbonization (hereinafter referred to as "milled carbon fibers").

The milled carbon fibers are produced usually by spinning a mesophase pitch as a starting material, infusibilizing the resultant spun fibers, carbonizing the resultant infusibilized fibers to form carbon fibers, and milling the resultant carbon fibers. In the following, simple description will be given of each of the production steps.

1) Pitch as the Starting Material

A pitch as the starting raw material is not limited to the pitch of any of resin base, petroleum base, coal base and synthesis base in which a catalyst is used. In particular, there is used an easily graphitizable pitch, preferably a mesophase pitch having a mesophase content of 100%.

The softening point of a pitch as the starting material is not specifically limited. It is advantageous, however, to employ a pitch having a low softening point from the aspect of spinning temperature, and also a pitch having a high infusibilization reaction rate from the viewpoint of production cost and product stability. Accordingly, the softening point of a pitch as the starting material is usually in the range of 230 to 350° C.

2) Spinning

The method for melt-spinning the pitch as the starting material is not specifically limited, and can be exemplified by a variety of methods such as melt spinning, melt blowing and centrifugal spinning, of which is preferable melt blow method from the standpoints of productivity at the time of spinning and the quality of the fibers thus obtained.

The spinning temperature is varied to some extent depending upon the pitch as the starting material, and needs to be not lower than the softening point of the pitch as the starting material, and also needs to be a temperature at which the pitch is not deteriorated. Hence, the spinning temperature is in the range of 300 to 400° C., preferably 300 to 380° C.

3) Infusibilization

The method for infusibilization is not specifically limited, but can be exemplified by a method in which the starting material is heat treated by a conventional method in an atmosphere of an oxidizing gas such as nitrogen dioxide and oxygen, a method in which the starting material is treated in an oxidizing aqueous solution of nitric acid, chromic acid or the like and a polymerizing treatment method using light, γ-ray or the like. More simple and convenient method is a method in which the starting material is heat treated in air at 200 to 350° C. for a definite period of time.

4) Carbonization

The infusibilized fibers can be made into carbon fibers by a conventional method through a heat treatment (carbonization) in the absence of an oxidizing gas, for instance, in an inert gas. There is no specific limitation at the time of the heat treatment to a temperature raising rate or a perservation time at a specific temperature. The carbonization temperature is in the range of preferably 500 to 1300° C., more preferably 600 to 900° C.

5) Milling (Pulverization)

The graphite materials for a negative electrode used in a lithium secondary battery is in general use in the form of powder or granule. It is preferable in the process according to the present invention to mill the carbon fibers which have been carbonized in the above-mentioned temperature range. It is desired in this case to carry out the milling, while maintaining the fiber configuration as such from the aspect of enhancing the performance of the battery.

With regard to the extent of milling, the smaller the particle diameter, preferably the higher the packing density in a battery. On the contrary, excessively fine fiber particle or the destruction of fiber configuration brings about such disadvantages as deterioration of battery capacity, that of charge and discharge efficiencies and the like, since an active graphite layer is exposed and is reacted with an electrolyte. It is therefore, required to assure a moderate particle diameter and particle size distribution as measured by a laser diffraction-type particle size distribution measuring apparatus. In view of the foregoing, graphite material having an average particle diameter of 5 to 50 μm is in general use.

Examples of milling machines that are usable in the process according to the present invention include optional milling machines such as ball mills, jet mills and high rotational speed mills. In particular, it is most preferable among them to employ a mill in which a rotor equipped with blades is rotated at a high speed, for instance, high rotational speed mills. In this case, the milled carbon fibers can be controlled in its fiber length by regulating the number of revolutions of the rotor, the clearance between the blade and the fixed knife and the like. It is desirable to use an abrasion resistant material at any portion liable to abrasion in the mill.

Graphitization

1) Graphitization Temperature

The graphitization treatment is put into practice usually at a temperature of 2000° C. or higher. As graphite materials for a negative electrode used in a lithium secondary battery as is the case with the present invention, it is required to further enhance the battery capacity, thus necessitating further proceeding of graphitization. Accordingly, it is preferable to carry out the graphitization at a temperature of 2400° C. or higher, more preferably 2500° C. or higher.

2) Graphitization Furnace

A variety of well-known furnaces are usable, provided that the furnaces are capable of packing carbon materials in graphite boxes and graphitizing said materials by heating. In particular, there is preferably usable on a commercial scale, a furnace (e.g. Acheson type furnace) in which a plurality of boxes are located therein, the periphery thereof is covered with coke, and direct current is applied from electrodes that are placed at both ends thereof.

3) Packing Carbon Materials in Boxes

Consideration is given to various sizes and shapes of the boxes, of which an appropriate size and shape are selected, taking into consideration workability of packing powder and granule to be graphitized, operability of charging and discharging the same, easiness of box processing and fabrication, period of time required for raising or lowering temperature at the time of graphitization treatment, graphitization cost, influence on product quality and like factors.

There are usually used boxes in the form of rectangular parallelopiped as shown in FIG. 1 the packing portions of which boxes have a length of 0.5 to 3.0 m, preferably 1.0 to 2.0 m; a width of 0.2 to 1.0 m, preferably 0.4 to 0.8 m; a height of 0.4 to 1.5 m, preferably 0.5 to 1.0 m; and an internal volume of 40 to 4500 l, preferably 200 to 1600 l. In regard to the material of construction of the boxes, a graphite material is preferably selected from the viewpoint of production cost and heat resistance.

The carbon materials in the form of powder or granule are packed in the aforestated boxes, which are carried in the graphitization furnace, where graphitization is carried out. The method for packing the materials is not specifically limited, but it is preferable to pack the same as uniformly and densely as possible so as to reduce the graphitization cost. It is also possible to perform the packing operation under shaking of the boxes.

4) Location of Boxes in Graphitization Furnace

An efficient location of boxes in the graphitization furnace is determined in accordance with the sizes and shapes of the furnace and boxes and the graphitization temperature.

In selecting the sizes of the furnace and boxes for the general Acheson furnace, it is so designed that carbon materials are graphitized in a plurality of boxes that are located in said furnace. In general, the location of the boxes in the graphitization furnace is such that the boxes having "M" numbers in the lengthwise direction of the furnace and "N" numbers in the lateral direction thereof are piled up in "L" numbers of stages.

The values of M, N and L of the boxes having a size and shape that are suitable for the process according to the present invention, can be determined almost equivocally from the size and shape of the furnace in question. In a commercial graphitization furnace, there are usually arranged the boxes having an M value of 8 to 40, an N value of 1 to 2 and an L value of 1 to 2.

Figure 2:
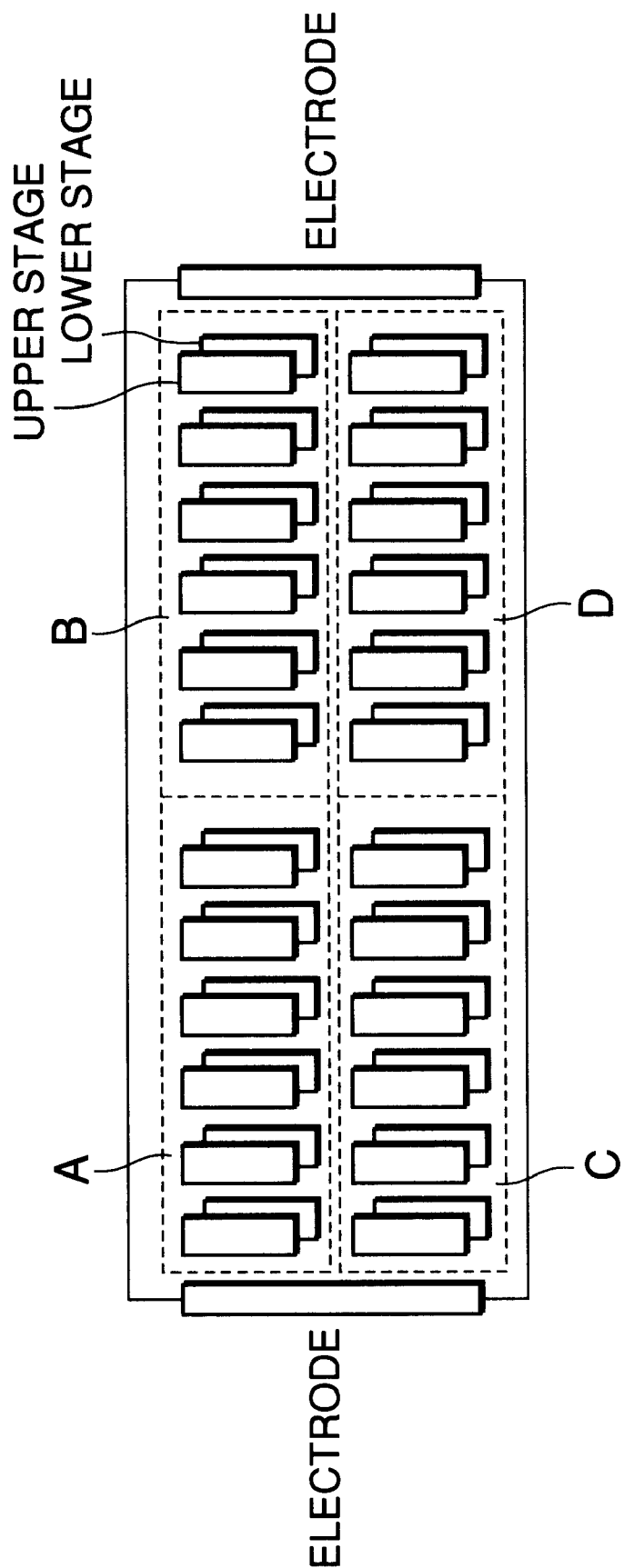
FIG. 2 is a schematic view showing one example of the arrangement of boxes in a graphitization furnace and one example of sampling positions in the process of the invention.

FIG. 2 is a schematic plan view showing a typical location of the boxes having an M value of 12, an N value of 2 and an L value of 2, thus making a total of 48 numbers of the boxes in a furnace.

Uniformization

The uniformization step plays an important role in stabilizing the quality of the graphite materials for a lithium secondary battery at a low cost after graphitization. That is to say, the uniformization step is capable of suppressing the influences on some variation in product quality which is possibly caused during the graphitization step. The important key factor in this step is the selection of both a mixer (agitator) and the target of quality control.

1) Selection of Mixer

There are available a rotational vessel type mixer, a ribbon blender and the like mixer as a mixer for agitating powder and/or granule. A fixed vessel type mixer equipped with a planetarily motional screw is exemplified as a mixer capable of efficiently uniformizing, within a relatively short period of time, the graphite materials having such a particle size as is the case with the process of the present invention without destroying individual graphite material.

This mixer, which is of inverse circular cone type, is particularly preferable in that it can efficiently agitate the materials in a comparatively mild manner without imparting unnecessary impact to the graphite materials, since a rotating rod equipped with spiral screws is allowed to revolve along the walls of the vessel of the mixer, while allowing the screw to rotate.

2) Quality Control Index

Physical properties of the graphite materials which exert some influence on the performances of the lithium secondary battery include various physical properties such as degree of graphitization, particle size distribution, specific surface area and electroconductivity. It is preferable to select degree of graphitization as an index for the uniformization after graphitization to be used in the process of the present invention, since intensive correlation is observed between the degree of graphitization and the performance of the battery.

In the present invention, the degree of graphitization is represented by the ratio of (101) diffraction peak in X-ray dffraction to (100) diffraction peak in the same, that is, (P101/P100). In the X-ray diffraction method, a diffraction pattern is determined by using $CuK_\alpha$-ray as an X-ray source and highly pure silicon as the standard reference material. The above-mentioned peak ratio (P101/P100) is obtained by drawing a base line on the resultant diffraction diagram, measuring the peak height of each of (101) and (100) from the base line, and dividing the height of (101) diffraction peak by the height of (100) diffraction peak.

The degree of graphitization is used as the index which indicates the extent of graphitization of the carbon material, and increases as the graphitization proceeds (heat treatment temperature is raised). The value of the aforesaid degree of graphitization is required to be at least 1.0 for the graphite materials for a negative electrode used in a lithium secondary battery.

Usually the quality control is put into practice by collecting a plurality of arbitrary samples for measuring the physical properties, and setting a control standard on the basis of the result of measured physical properties.

Various investigations were made on possibly applicable control indexes, paying attention to the variation coefficient of degree of graphitization [(maximum degree of graphitization−minimum degree of graphitization)÷average degree of graphitization×100 (%)] in consideration of mixer selection, operational method, method for collecting samples to be measured, accuracy and precision in measurement, influences on the performance of batteries and the like factors. As a result, it has been found that graphite materials which are minimized in the variation of battery performance during a moderate period of time can favorably be provided by the use of the foregoing variation coefficient of degree of graphitization as an index in the uniformization procedure. It has also been found that such physical properties as particle size and specific surface area are uniformized by the above mixing almost in correlation with the degree of graphitization.

3) Mixing Graphite Materials

It is the basic principle from the viewpoint of quality stabilization and operability to collectively uniformize all the graphite materials packed in all of the boxes which have simultaneously been graphitized in the furnace. However, the mixer capacity can advantageously be reduced by dividing a plurality of the boxes located in the furnace into several groups, taking into consideration the relation between the amount of the materials to be graphitized per one batch and the mixer capacity, and then mixing all the materials per each of the groups.

However, in the case of dividing into several groups, importance should be attached to sufficient consideration of the heat history of each of the boxes in the furnace for the purpose of equalizing the degree of uniformization in each of the groups. For this reason, it is preferable to divide the boxes into two or four groups so as to form a symmetric box arrangement when viewed from upside, mix the graphite materials in all the boxes of the same group per each of the groups to carry out uniformization treatment.

The above-mentioned mode of division is based on the fact from the results of measuring the degree of graphitization for the simultaneously graphitized materials in each of the boxes. The aforesaid fact is that difference in heat history is observed between the boxes at an end of the furnace and the boxes at the central portion thereof (the central portion is apt to become hotter), but difference in heat history is hardly observed between the boxes at an end of the furnace and the boxes at the other end thereof.

In the case where the boxes are vertically piled up, there is a fear of causing some difference in the degree of graphitization even between the boxes placed at the same position when viewed from upside, that is, between the boxes one of which is piled up immediately above the other. For this reason, it is unfavorable to divide the boxes into upper and lower groups of boxes. Instead, it is favorable to divide the boxes lengthwise and/or laterally in the same plane of the furnace.

4) Uniformization of Graphite Materials (Mixing, Agitation, Etc.)

As mentioned above, the graphite materials in all the boxes in the furnace or in all the boxes of each of the box groups, are uniformized by mixing and agitation with a mixer. The capacity of the mixer is not specifically limited, but is desirably suitably determined taking into consideration the amount of the graphite materials to be graphitized per one batch, degree of uniformization, etc. In the case of a fixed vessel type mixer equipped with planetarily motional screws, there is preferably usable said mixer having a capacity per one batch of 1,000 kg to 10,000 kg, approximately.

It would seem that the uniformization is performed more advantageously with an increase in the mixing period of time by means of the mixer. However, an excessively long mixing period of time is unfavorable, since there is a fear of deteriorating the physical properties of the graphite materials. Thus it is desirable in the present invention to set the mixing period of time on about 10 to 120 minutes so as to achieve the objects of the invention.

Moreover it is important, for the purpose of further enhancing the performance of a lithium secondary battery in the present invention when necessary, to remove granular agglomerated fixed substances that are likely to be formed by the influence of volatile substances at the time of graphitization before or after the foregoing uniformization. Various considerations may be given to the methods for removing said granular substances, and the removal thereof with a screen having a moderate mesh is preferable from the aspects of the simplicity and operability of machinery and equipment as well as operation cost.

II. Uniformization in Mixing Two or More Kinds of Graphite Materials

The graphite materials are not specifically limited, provided that the materials are applicable to a negative electrode for use in a lithium secondary battery. The process of the present invention is applicable to the case of mixing two or more kinds of graphite materials different in shape, particle size or property that are selected from artificial graphite such as milled graphite fibers, and natural graphite.

Uniformization

The uniformization step plays an important role in suppressing the variability of the product after mixing and at the same time, stabilizing the product quality in the case of mixing two or more kinds of graphite materials for a lithium secondary battery as is the case with the graphite material after graphitization.

1) Selection of Mixer

As is the case with the above-mentioned uniformization after graphitization, a variety of mixers are usable. It is preferable to employ a fixed vessel type mixer equipped with planetarily motional screws for its capability of efficient uniformization within a comparatively short period of time without destroying individual graphite materials.

2) Index of Quality Control

It is preferable to select degree of graphitization as the index of quality control in the same manner as in the foregoing uniformization after graphitization. However in the case of mixing the materials each having almost the same degree of graphitization, it is preferable to measure average particle size, specific surface area and the like factors and then select the index which shows much difference between materials for mixing.

3) Uniformization of Graphite Materials (Mixing, Agitation, Etc.)

The uniformization of graphite materials may be carried out by charging the mixer with a properly selected amount of the graphite materials so as to match the capacity of the machinery and equipment, and performing mixing and agitation in accordance with the above-mentioned uniformization after graphitization.

III. Negative Electrode for Secondary Battery

The graphite materials to be used in the process according to the present invention can be made into a negative electrode by a conventional method, that is, a widely usable method comprising the steps of adding a binder such as polyethylene or polytetrafluoroethylene to the graphite material; making the resultant mixture into the form of slurry by the use of an organic solvent or water as the solvent; applying the slurry thus obtained to either or both sides of a metallic foil composed of copper, nickel or the like having a thickness of 10 to 50 $\mu$m; rolling the coated foil thus obtained; and drying the same into a sheet product having a thickness of about 100 $\mu$m. Thereafter the sheet product is usually slitted into a prescribed width and length, and the resultant slitted pieces are made into the form of can by winding together with a positive electrode and a separator.

In the case of preparing a lithium secondary battery by the use of the graphite materials as mentioned hereinbefore, the electrolytic solution used therein needs only to be capable of dissolving a lithium salt, and is preferably a non-protolytic organic solvent having a high dielectric constant.

Examples of the above-mentioned organic solvent include ethylene carbonate, propylene carbonate, tetrahydrofuran, 2-methyltetrahydrofuran, dioxolan, 4-methyl-dioxolan, acetonitrile, dimethyl carbonate, methylethyl carbonate and diethyl carbonate. Any of these solvents may be used alone or by mixing with at least one other.

A preferable example of the electrolyte is a lithium salt which forms a stable anion, said salt being exemplified by lithium perchlorate, lithium borofluoride, lithium hexachloroantimonate and lithium hexafluoroantimonate. Examples of positive electrodes that are usable in a lithium secondary battery include a metal oxide such as a chromium oxide, a titanium oxide, a cobalt oxide and vanadium pentaoxide; a lithium metal oxide such as lithium-manganese oxide ($LiMn_2O_4$), lithium-cobalt oxide ($LiCoO_2$) and lithium-nickel oxide ($LiNiO_2$); a chalcogen compound of a transition metal such as titanium sulfide and molybdenum sulfide; and a conjugate high-molecular substance having electroconductivity such as polyacetylene, poly-p-phenylene and polypyrrole.

There is interposed, between a positive electrode and a negative electrode that are oppposed to each other, a separator comprising nonwoven fabric or woven fabric each made of synthetic fiber or glass fiber, a polyolefin-based porous film, nonwoven fabric made of polytetrafluoroethylene or the like material.

The above-mentioned lithium secondary battery in the form of cylinder, square, button or the like can be fabricated according to a conventional method by the use of the specific negative electrodes in connection with the present invention, positive electrodes and other battery constituents such as the separator as mentioned above, electricity collectors, gaskets, sealing plates and a battery case.

As detailed hereinbefore, the present invention provides a process for producing graphite materials for a negative electrode to be used in a lithium secondary battery, which process is capable of stabilizing the quality of the graphite materials and expanding the productivity thereof by lessening the variation in degree of graphitization after the graphitization treatment. The process exhibits the same working effect as the foregoing in the case of mixing two or more kinds of graphite materials that are different in the shape, size, properties or the like of particles from one another.

In the folowing, the present invention will be described in more detail with reference to comparative examples and working examples, which however shall not limit the present invention thereto.

EXAMPLE 1 AND COMPARATIVE EXAMPLE 1

Pitch fibers were prepared by melt blow spinning using optically anisotropic petroleum-base mesophase pitch having a softening point of 280° C. as the starting material. The spun pitch had a viscosity of 12 poise. The spun pitch fibers were collected in the form of mat on a stainless steel-made wire mesh belt, and subsequently was heated in the air to raise the temperature thereof from room temperature to 300° C. at an average temperature raising rate of 6° C. per minute to proceed with infusibilization treatment.

The infusibilized mesophase pitch fibers thus obtained were subjected to carbonization treatment at 650° C. to produce carbon fibers. The resultant carbon fiber was milled with a high-speed rotation type mill to produce milled carbon fiber. Then a measurement was made of the particle diameter of the resultant milled carbon fibers by means of a laser diffraction system measuring apparatus for particle size distribution. As a result, the average particle diameter thereof was 18 $\mu$m.

Subsequently, in a directly current-passing Acheson-type graphitization furnace were placed, as illustrated in FIG. 2, 48 numbers of graphite-made boxes as shown in FIG. 1 which had each a dimension of 1.2 m×0.5 m×0.8 m and an internal volume of 480 l and which contained 350 kg of the above-obtained milled carbon fibers. Then the temperature inside the furnace was raised to 2800° C. to carry out graphitization treatment.

After the resultant graphite materials were allowed to cool, samples for measurement were collected from the prescribed positions in each of the boxes as shown in FIG. 2. The boxes were so arranged that 48 boxes were divided into 4 groups A, B, C and D each consisting of 12 boxes, and were designated as No. 1 through No. 48 including No. 1 through No. 6 in group A in the upper stage starting from the left end and reaching the right end; including No. 7 through No. 12 in group A in the lower stage starting from the left end and reaching the right end; including No. 13 through No. 18 in group B in the upper stage starting from the left end and reaching the right end; including No. 19 through No. 24 in group B in the lower stage starting from the left end and reaching the right end; and including No. 25 through No. 48 in groups C and D in the same manner and order as the preceding system. The results of measurement of degree of graphitization are given in Table 1.

The resultant graphite materials in 48 boxes was mixed per each of the groups, and the materials in the respective groups was each agitated for 15 minutes by the use of a Nauter mixer having a capacity of 4000 kg produced by Hosokawa Micron Co., Ltd. to carry out uniformization work.

After the completion of agitation, the agitated graphite materials were sampled per each of the groups from 12 optional positions in the mixer, and measurements were made of degree of graphitization, and of particle size by means of a laser diffraction system measuring apparatus for particle size distribution for each of the samples. The results are given in Table 2.

The results in Tables 1 & 2 demonstrate that the variation coefficient for degree of graphitization decreased from 12.9% before uniformization to 3.2% after uniformization in each of the groups, and that the variation coefficient for average degree of graphitization among the groups was about 1.0%, which was far smaller than the above.

In addition, measurements were made of battery characteristics of the sample A-2 typified by the highest degree of graphitization and the sample D-3 typified by the lowest degree of graphitization. The results are given in Table 3, in which are also given, for the purpose of comparison, the results of measurements of battery characteristics for the sample from box No. 31 showing least degree of graphitization before uniformization.

The characteristics for charge and discharge capacities of the graphite materials as the negative electrode were measured 10 times each repeatedly by the use of metallic lithium as the positive electrode also as the reference electrode in the electrolytic solution having one molar concentration of lithium perchlorate ($LiClO_4$) as the electrolyte in a mixed solvent of carbonic acid ester of ethylene carbonate (EC)/dimethyl carbonate (DMS) at a ratio by volume of 1:1 under charging or discharging at a constant current of 100 mA within the range of measured potential of 0 to 1.5V/Li/Li$^+$.

TABLE 1

| Box No. | Deg. of graphitization | Box No. | Deg. of graphitization |
| --- | --- | --- | --- |
| 1 | 1.22 | 25 | 1.20 |
| 2 | 1.26 | 26 | 1.23 |
| 3 | 1.27 | 27 | 1.24 |
| 4 | 1.30 | 28 | 1.21 |
| 5 | 1.28 | 29 | 1.26 |
| 6 | 1.25 | 30 | 1.25 |
| 7 | 1.23 | 31 | 1.17 |
| 8 | 1.24 | 32 | 1.22 |
| 9 | 1.30 | 33 | 1.20 |
| 10 | 1.27 | 34 | 1.23 |
| 11 | 1.28 | 35 | 1.23 |
| 12 | 1.33 | 36 | 1.22 |
| 13 | 1.24 | 37 | 1.25 |
| 14 | 1.19 | 38 | 1.26 |
| 15 | 1.19 | 39 | 1.28 |
| 16 | 1.26 | 40 | 1.24 |
| 17 | 1.24 | 41 | 1.27 |
| 18 | 1.20 | 42 | 1.22 |
| 19 | 1.31 | 43 | 1.25 |
| 20 | 1.26 | 44 | 1.13 |
| 21 | 1.27 | 45 | 1.20 |
| 22 | 1.31 | 46 | 1.25 |
| 23 | 1.24 | 47 | 1.19 |
| 24 | 1.20 | 48 | 1.26 |

Maximum Value: 1.33 Minimum Value: 1.17 Average Value: 1.244 Variation Coeffecient: 12.9%

TABLE 2

| Group A | | | Group B | | | Group C | | | Group D | | |
| --- | --- | --- | --- | --- | --- | --- | --- | --- | --- | --- | --- |
| Sample | DGr | APD. (μm) | Sample | DGr | APD. (μm) | Sample | DGr | APD. (μm) | Sample | DGr | APD. (μm) |
| A-1 | 1.25 | 16.9 | B-1 | 1.23 | 17.0 | C-1 | 1.27 | 16.9 | D-1 | 1.24 | 16.8 |
| A-2 | 1.28 | 16.8 | B-2 | 1.24 | 16.9 | C-2 | 1.25 | 16.9 | D-2 | 1.25 | 16.9 |
| A-3 | 1.24 | 17.1 | B-3 | 1.24 | 17.0 | C-3 | 1.25 | 17.0 | D-3 | 1.22 | 16.9 |
| A-4 | 1.26 | 17.0 | B-4 | 1.23 | 16.9 | C-4 | 1.26 | 17.1 | D-4 | 1.24 | 17.1 |
| A-5 | 1.26 | 16.8 | B-5 | 1.25 | 16.9 | C-5 | 1.24 | 17.0 | D-5 | 1.25 | 17.0 |
| A-6 | 1.24 | 17.1 | B-6 | 1.25 | 17.1 | C-6 | 1.24 | 16.8 | D-6 | 1.25 | 17.0 |
| A-7 | 1.24 | 18.9 | B-7 | 1.24 | 17.0 | C-7 | 1.23 | 16.8 | D-7 | 1.23 | 17.0 |
| A-8 | 1.26 | 17.0 | B-8 | 1.23 | 17.0 | C-8 | 1.25 | 16.9 | D-8 | 1.26 | 16.9 |
| A-9 | 1.25 | 16.9 | B-9 | 1.23 | 16.9 | C-9 | 1.23 | 17.2 | D-9 | 1.26 | 17.1 |
| A-10 | 1.24 | 16.9 | B-10 | 1.23 | 16.9 | C-10 | 1.25 | 17.2 | D-10 | 1.23 | 16.8 |
| A-11 | 1.24 | 16.8 | B-11 | 1.26 | 16.9 | C-11 | 1.24 | 17.0 | D-11 | 1.24 | 17.2 |
| A-12 | 1.25 | 17.0 | B-12 | 1.24 | 16.8 | C-12 | 1.25 | 16.9 | D-12 | 1.25 | 16.8 |
| Max. Val. | 1.28 | 17.1 | Max. Val. | 1.26 | 17.1 | Max. Val. | 1.27 | 17.2 | Max. Val. | 1.26 | 17.1 |
| Min. Val. | 1.24 | 16.8 | Min. Val. | 1.23 | 16.8 | Min. Val. | 1.23 | 16.8 | Min. Val. | 1.22 | 16.8 |
| Ave. Val. | 1.25 | 16.93 | Ave. Val. | 1.239 | 16.94 | Ave. Val. | 1.247 | 16.96 | Ave. Val. | 1.242 | 16.96 |

TABLE 2-continued

| | Group A | | | Group B | | | Group C | | | Group D | |
|---|---|---|---|---|---|---|---|---|---|---|---|
| Sample | DGr | APD. (μm) | Sample | DGr | APD. (μm) | Sample | DGr | APD. (μm) | Sample | DGr | APD. (μm) |
| Var. Cof. | 3.2% | 1.8% | Var. Cof. | 2.4% | 1.8% | Var. Cof. | 3.2% | 2.4% | Var. Cof. | 3.2% | 2.4% |

[Remarks] DGr: degree of graphitization
APD: average particle diameter
Max. Val.: maximum value
Min. Val.: minimum value
Ave. Val.: average value
Var. Cof.: variation coefficient

TABLE 3

| Sample | Degree of Graphitization | Initial Charge Capacity (mAH/g) | 10th Discharge Capacity (mAH/g) |
|---|---|---|---|
| A-2 | 1.28 | 344 | 320 |
| D-3 | 1.22 | 338 | 315 |
| Sample before Uniformization No. 31 | 1.17 | 326 | 303 |

EXAMPLE 2

A mixture which has been prepared by mixing 36 kg of milled carbon fibers as obtained in Example 1 with 12 kg of artificial graphite, was agitated for 5 minutes, 10 minutes, and 20 minutes, respectively, by the use of the Nauter Mixer which had been used in Example 1. After the completion of the agitation, samples were collected from three positions including top, middle and bottom portions in the mixer for each agitation time, thus making a total of nine samples. Subsequently, measurements were made of interplanar spacing of the graphite layer $d_{002}$ and particle size distribution of each of the samples. The results are given in Table 4.

Table 4 also gives interplanar spacing of the graphite layer $d_{002}$ along with particle size distribution for the milled carbon fibers alone, the artificial graphite alone which had been used in this example, and calculated expected values for interplanar spacing of the graphite layer $d_{002}$ along with particle size distribution for the mixture thereof.

As is clear from Table 4, there is only small difference in each performance among the samples collected from the top, middle and bottom portions in the mixer, respectively, and the performances thereof are approximate to the calculated expected values. Accordingly it is understood from the above results that sufficient uniformization has been accomplished by the process according to the present invention within a short period of time without exerting influence upon the physical properties of the graphite materials.

Moreover, battery characteristics were measured in the same manner as in Example 1 by the use of the samples collected after 10 minutes of agitation. The results are given in Table 5.

TABLE 4

| | | Interplanar Spacing $d_{002}$ | Particle Size Distribution | | |
|---|---|---|---|---|---|
| | | | 10% D (μm) | 50% D (μm) | 90% D (μm) |
| Milled Carbon Fiber | | 0.3362 | 9.6 | 18.2 | 56.7 |
| Artificial Graphite | | 0.3351 | 3.9 | 9.2 | 18.4 |
| *Calculated Expected After Agitational Uniformization | | 0.3359 | 5.5 | 13.4 | 31.7 |
| 5 min | Top portion | 0.3358 | 5.9 | 13.1 | 33.0 |
| | Middle portion | 0.3359 | 5.7 | 12.8 | 32.4 |
| | Bottom portion | 0.3358 | 5.7 | 12.7 | 31.8 |
| 10 min | Top portion | 0.3359 | 5.6 | 12.7 | 32.2 |
| | Middle portion | 0.3357 | 6.0 | 13.0 | 34.0 |
| | Bottom portion | 0.3359 | 5.9 | 13.1 | 33.5 |
| 20 min | Top portion | 0.3358 | 6.0 | 13.1 | 33.8 |
| | Middle portion | 0.3358 | 5.5 | 12.6 | 32.9 |
| | Bottom portion | 0.3359 | 5.6 | 12.8 | 33.0 |

{Remarks}
*Calculated Expected: Calculated expected value for the mixture of the milled carbon fibers and the artificial graphite.

TABLE 5

| Sample Uniformized for 10 minutes | Initial Charge Capacity (mAH/g) | 10th Discharge Capacity (mAH/g) |
|---|---|---|
| Top Portion | 349 | 331 |
| Middle Portion | 354 | 330 |
| Bottom Portion | 352 | 334 |

What is claimed is:

1. A process for producing graphite materials for a negative electrode used in a lithium secondary battery which process comprises the steps of packing carbon materials having an average particle diameter of 5 to 50 μm in a plurality of boxes, placing the boxes in a graphitization furnace, subjecting said materials to graphitization treatment, and thereafter subjecting the resultant graphite materials to uniformization treatment by mixing and agitation.

2. The process for producing graphite materials for a negative electrode used in a lithium secondary battery according to claim 1, wherein the graphite materials in all the boxes that are located in the graphitization furnace is subjected to uniformization treatment by collective mixing and agitation or divided mixing and agitation wherein said plurality of boxes are divided into prescribed numbers of box groups, and the graphite materials contained in all the boxes belonging to each box group are individually mixed and agitated per each box group.

3. The process for producing graphite materials for a negative electrode used in a lithium secondary battery according to claim 1, wherein the uniformization treatment is carried out by the use of a fixed vessel-type mixer equipped with a planetarily motional screw.

4. The process for producing graphite materials for a negative electrode used in a lithium secondary battery according to any one of claims 1 to 3, wherein the carbon materials are milled carbon fiber which are produced by spinning a mesophase pitch as a starting material, infusibilizing the spun fibers, carbonizing the infusibilized fibers to form carbon fiber, milling the carbon fibers thus obtained, and regulating the particle size of the milled carbon fibers.

5. The process for producing graphite materials for a negative electrode used in a lithium secondary battery according to claim 4, wherein the graphite materials obtained by subjecting the milled carbon fibers as set forth in claim 4 to graphitization treatment are mixed with at least one other kind of graphite material by the use of a fixed vessel-type mixer equipped with a planetarily motional screw.

* * * * *